Dec. 13, 1966 R. S. TRIMMER 3,291,271
ROTARY FLUID TRANSMISSION
Filed Dec. 11, 1964
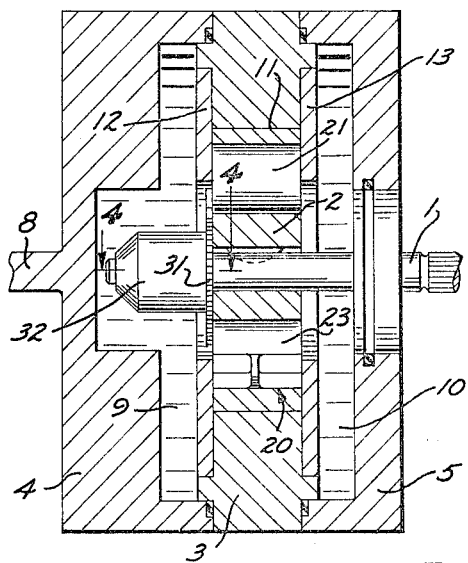
FIG. 1
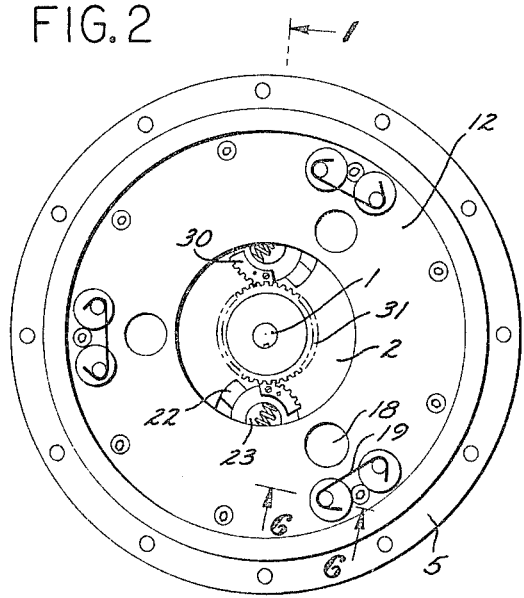
FIG. 2
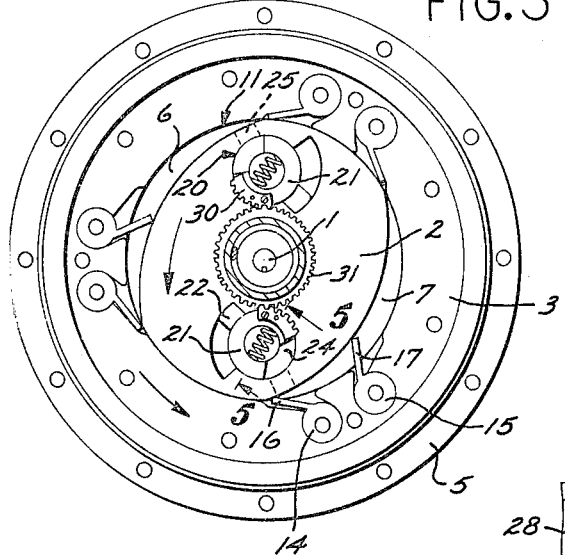
FIG. 3
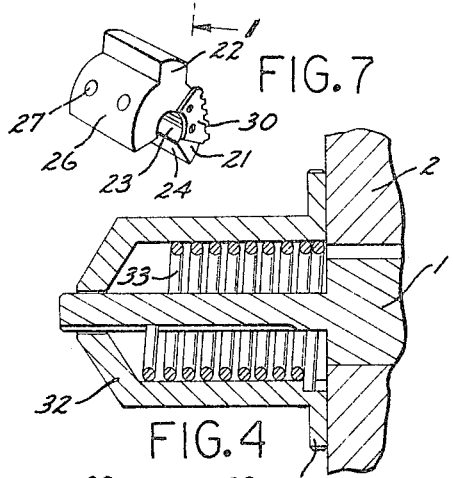
FIG. 7
FIG. 4
FIG. 5
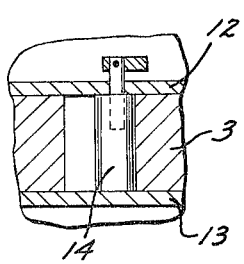
FIG. 6
INVENTOR.
RUSSELL S. TRIMMER
BY
ATTORNEY

United States Patent Office 3,291,271
Patented Dec. 13, 1966

3,291,271
ROTARY FLUID TRANSMISSION
Russell S. Trimmer, 14703 Gibson Ave., Compton, Calif.
Filed Dec. 11, 1964, Ser. No. 417,569
11 Claims. (Cl. 192—58)

This invention relates to a rotary fluid transmission whereby the r.p.m., of the driving engine of the transmission is determined by the load which the engine is pulling. The greater the load the higher will be the r.p.m., of the engine up to the designed limits of the engine and the transmission. This present invention is an improvement of my co-pending application Serial No. 284,476, filed May 31, 1963, now Pat. No. 3,204,736.

An object of my invention is to provide a novel rotary fluid transmission which will automatically permit the r.p.m., of the engine to increase when the load which is carried by the engine should materially increase.

Another object of my invention is to provide a novel rotary fluid transmission which will permit the compression of the engine to be utilized when the vehicle in which the engine is mounted is rolling downhill, and also will permit the forward motion of the vehicle to turn the engine crankshaft in order to start the engine without the aid of the starting motor.

Still another object of my invention is to provide a novel rotary fluid transmission in which the movement of fluid through the transmission is controlled by a centrifugally actuated rotary valve.

Other objects, advantages and features of invention may appear from the accompanying drawing, the subjoined detailed description and the appended claims.

In the drawing:

FIGURE 1 is a vertical sectional view taken on the line 1—1 of FIGURE 2.

FIGURE 2 is a side elevation of my transmission with one-half of the case removed.

FIGURE 3 is a side elevation of my transmission with one-half of the case and one of the side plates removed.

FIGURE 4 is a fragmentary sectional view taken on line 4—4 of FIGURE 1.

FIGURE 5 is a fragmentary sectional view taken on line 5—5 of FIGURE 3.

FIGURE 6 is a fragmentary sectional view taken on line 6—6 of FIGURE 2.

FIGURE 7 is a perspective view of a valve core.

Referring more particularly to the drawing, the numeral 1 indicates the driving shaft which extends from the engine or motor (not shown). The shaft 1 is fixedly attached to or keyed to the rotor 2, which is prolate in shape. The exact shape of the rotor 2 is not critical and can be a modified ellipse in shape, or other similarly shaped structures, to provide compression chambers on two sides of the rotor, as will be subsequently described. The rotor 2 is positioned within a ring 3 and the ring, in turn, is fixedly mounted between the halves 4–5 of the housing. The two parts 4–5 of the housing are bolted together and the bolts also pass through the ring 3, thus securely fastening all of these parts together. The housing sections 4–5 and the ring 3 are thus all fixed as a unit and rotate independently of the rotor 2. The prolate shaped rotor 2 will form the two compression chambers 6 and 7 with the ring 3, as shown in FIGURE 3. A driven shaft 8 extends from the housing section 4 and is in alignment with the drive shaft 1. This driven shaft in turn can rotate a suitable unit and its r.p.m., will vary with relation to the drive shaft 1, as will be subsequently described. The ring 3 is approximately centrally positioned between the housing sections 4 and 5, and two sumps 9 and 10 are thus provided in the sections 4 and 5 respectively, and these sumps are positioned on each side of the ring 3. The sumps 9 and 10 are entirely filled with a suitable fluid, such as oil. This fluid flows into and out of transverse chambers extending through the ring 3, as will be subsequently described in detail. The ring 3 is formed with a cylindrical inner surface 11 and this surface is swept by the outer surface of the maximum diameter of the prolate rotor 2, and this surface is the outer or peripheral portion of the compression chambers 6 and 7. As the rotor 2 is driven by the engine or motor it will sweep the cylindrical surface 11 and will move fluid contained in the compression chambers 6 and 7 continuously in a circular movement.

The rotor 2 is held in proper alignment with the ring 3 by means of two side plates 12–13, which are bolted or otherwise fixedly attached to each side of the ring 3.

The compression chambers 6 and 7 are terminated at both top and bottom thereof by means of three pairs of sealing members as follows:

The sealing members are identical in construction and only one pair will be described in detail. At one end of each of the compression chambers 6 and 7 I provide a cylinder 14 which extends transversely of and is journaled in the ring 3. A second cylinder 15 is similarly mounted adjacent the cylinder 14, as best shown in FIGURE 3. The cylinder 14 is provided with a finger 16, which is preferably integral therewith, and the outer end of the finger bears against the periphery of the rotor 2. A similar finger 17 projects from the cylinder 15 and also bears against the periphery of the rotor 2. The fingers 16 and 17 are oppositely directed for the purpose of confining fluid between successive fingers, the fluid being within the compression chambers 6 and 7. As the rotor 2 rotates in the direction shown by the arrow, the finger 17 will act as the means of confining fluid within the compression chambers.

To supply oil to the compression chambers 6–7 from the sumps 9–10 I provide three holes 18 in the plates 12 and 13, and these holes are each positioned opposite each pair of sealing members 14–15. Thus the compression chambers 6 and 7 can be filled as required, and particularly the area between the fingers 16 and 17 can be kept filled with oil. The sealing members, and particularly the cylinders 14 and 15 thereof, are each engaged by a spring 19 which tends to rotate these cylinders so that the fingers 16–17 will engage the periphery of the rotor 2 at all times.

At two points in the rotor 2, and arranged 180° from each other, I provide two transverse valve bores 20 which extend entirely through the rotor 2 and transversely thereof, so that these valve bores are open on each side to the sumps 9 and 10. In each of the bores 20 there is positioned a valve core 21 which can be partially rotated in the bore 20. The valve core 21 is provided with an eccentric weight 22 which is integral with the valve core and causes the valve core to partially rotate under centrifugal force when the rotor 2 is rotating. A return port 23 extends entirely through the valve core 21 and permits oil to flow back into the sumps 9 and 10 from the compression chambers 6 and 7. A slot-shaped port 24 is formed in the valve core 21 and opens into the return port 23. A port 25 in the rotor 2 is positioned opposite the port 24 and also extends through the periphery of the rotor 2, so as to provide an oil passage from the compression chambers 6 and 7, thence to the slot-shaped port 24, and then to the return bore 23 and thence to the sumps 9 and 10. The previously described movements of oil under pressure occur when the valve core 21 is in one position, namely, with the port 24 of the valve core opposite the port 25. When the rotor 2 is rotating, centrifugal force acting on the weight 22 will rotate the valve core 21 in the bore 20, until the arcuate wall 26 of the valve core 21 is covering the port 25 in the rotor 2. In this position of the valve core 21 oil cannot return to the sumps 9–10 and, consequently, will be compressed in the compression chambers 6 and 7, causing the ring 3 and the housing halves 4–5 to rotate with the rotor 2 and in the same direction. Within the arcuate wall 26 I provide emergency relief ports 27, which are normally held closed by a spring pressed ball 28. When the pressure in the compression chambers 6 and 7 is sufficiently high to compress the springs 29, the balls 28 will be unseated, and again oil under pressure can by-pass these balls and enter the return port 23 and thence to the sumps 9–10.

In order that the valve cores 21 may be properly timed so that they move together, I provide a gear segment 30 on one end of each of the valve cores, and these gear segments both mesh with a gear 31. The gear 31 includes a cup 32 which is integral therewith and which surrounds one end of the shaft 1. A spring 33 within the cup is secured at one end to the shaft 1 and at its other end to the gear 31, so that the tension of this spring will tend to return the valve cores 21 to a position where the port 24 is opposite the relief 25. That is, the spring 33 opposes the centrifugal force acting on the weight 22.

*In operation*

When the parts are stationary the sumps 9 and 10 being completely filled with oil would also completely fill the compression chambers 6 and 7. When the shaft 1 starts to rotate the rotor 2 will also rotate therewith, and centrifugal force will start to act on the weight 22 to rotate the valve core 21 and to gradually close the outlet port 25 in the rotor 2. As the return flow of oil from the compression chambers 6–7 to the sumps 9–10 is restricted, the compression will build up in the chambers 6 and 7 and the ring 3, and the housing 4–5 will start to rotate since oil is pressing against the fingers 16 and thus transmitting torque to the ring 3 and the housing parts 4–5. When the rotor 2 reaches a designed speed the ring 3 will be rotating in approximately a one to one ratio with the rotor. If compression builds up in the chambers 6–7 beyond a designed amount, the relief balls 28 will be pressed off of their seats, thus relieving excess pressure in the compression chambers. The two valve cores 21 will both rotate synchronously, since they are both geared to the same gear 31 and are thus coordinated. The spring 33 will return the cores 21 to the initial or at rest position when the rotor 2 comes to rest, or nearly so. The ports 18 in the plates 12–13 will keep the compression chambers 6–7 filled with oil at all times, and particularly the space between the fingers 16–17.

Having described my invention, I claim:

1. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, and a plurality of holes in said rotor extending from the sump to each of said compression chambers through which holes fluid passes to and from the compression chambers and the sump, and valve means in the rotor and within said holes to control fluid passage through said holes, and means governing the movement of the valve means to control the flow of fluid through said holes.

2. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, and a plurality of holes in said rotor extending from the sump to each of said compression chambers through which holes fluid passes to and from the compression chambers and the sump, and valve means in the rotor and within said holes to control fluid passage through said holes, and means governing the movement of the valve means to control the flow of fluid through said holes, said means governing the valve means being operable by centrifugal force exerted by rotation of the rotor.

3. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, and a plurality of holes in said rotor extending from the sump to each of said compression chambers through which holes fluid passes to and from the compression chambers and the sump, and valve means in the rotor and within said holes to control fluid passage through said holes, and means governing the movement of the valve means to control the flow of fluid through said holes, sealing means in the housing slidably engaging the periphery of the rotor, said sealing means forming one end of each compression chamber.

4. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, and a plurality of holes in said rotor extending from the sump to each of said compression chambers through which holes fluid passes to and from the compression chambers and the sump, and valve means in the rotor and within said holes to control fluid passage through said holes, and means governing the movement of the valve means to control the flow of fluid through said holes, said means governing the valve means being operable by centrifugal force exerted by rotation of the rotor, sealing means in the housing slidably engaging the periphery of the rotor, said sealing means forming one end of each compression chamber.

5. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, and said rotor having a port therein extending to the port in said valve core.

6. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, said rotor having a port therein extending to the port in said valve core, and means on the valve core operable by centrifugal force to rotate the valve core in said transverse bore in the rotor.

7. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, said rotor having a port therein extending to the port in said valve core, an eccentric weight on the valve core operable by centrifugal force to rotate the valve core in the transverse bore in the rotor.

8. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core having a port therein extending to the sump, said rotor having a port therein extending to the port in said valve core, and spring means engaging the valve core to urge the valve core to a position permitting flow of fluid through said holes.

9. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, said rotor having a port therein extending to the port in said valve core, an eccentric weight on the valve core operable by centrifugal force to rotate the valve core in the transverse bore in the rotor, and spring means engaging the valve core to urge the valve core to a position permitting flow of fluid through said holes.

10. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, said rotor having a port therein extending to the port in said valve core, and pressure relief means in the valve core permitting fluid flow from the compression chamber to the sump in the closed position of the valve core.

11. A rotary fluid transmission comprising a housing, a rotor rotatably mounted in said housing, said housing having a plurality of compression chambers therein, said compression chambers being arranged between the outer surface of the rotor and the inner surface of the housing, said housing having a sump therein adjacent said rotor, a transverse bore in the rotor extending from a compression chamber to the sump through which bore fluid passes to and from the compression chamber and the sump, a valve core in the bore, said valve core having a port therein extending to the sump, said rotor having a port therein extending to the port in said valve core, an eccentric weight on the valve core operable by centrifugal force to rotate the valve core in the transverse bore in the rotor, and pressure relief means in the valve core permitting fluid flow from the compression chamber to the sump in the closed position of the valve core.

References Cited by the Examiner

UNITED STATES PATENTS

| 2,240,662 | 5/1941 | Montgomery | 192—57 |
| 2,660,279 | 11/1953 | Knight | 192—58 |
| 2,735,529 | 2/1956 | Austin | 192—58 |

DAVID J. WILLIAMOWSKY, *Primary Examiner.*

A. T. McKEON, *Assistant Examiner.*